(No Model.)
J. J. BOOTH & W. FLINN.
MEASURING TOOL.
No. 544,475.  Patented Aug. 13, 1895.
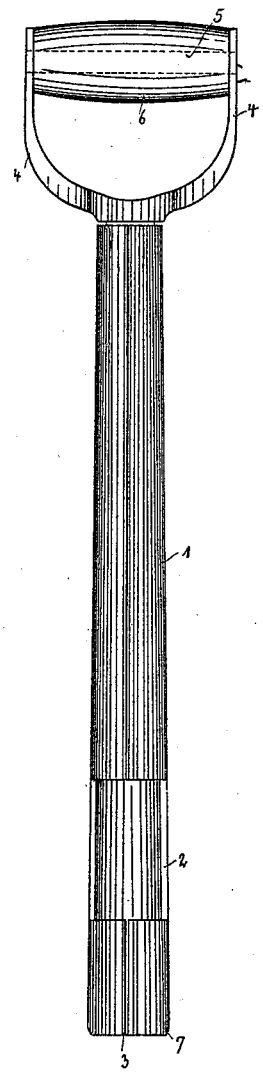
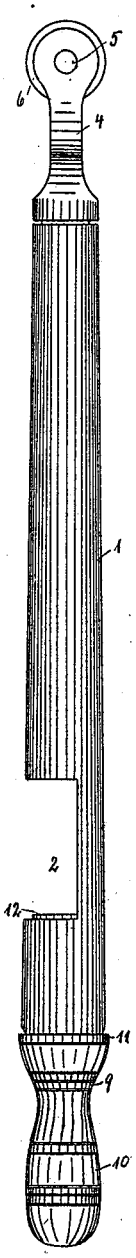
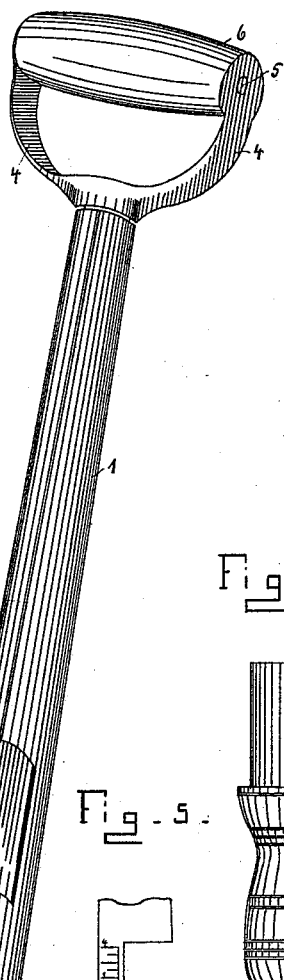
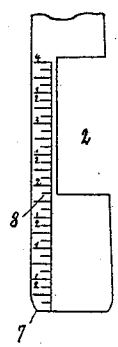
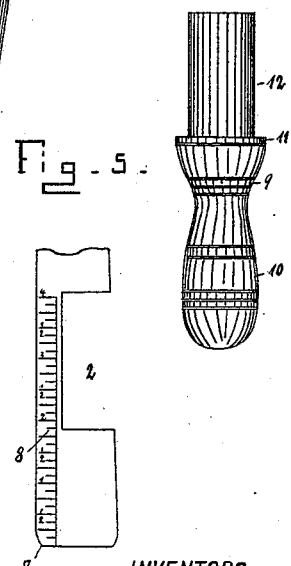
WITNESSES:
C. L. Reese
W. E. Elbers
INVENTORS.
James J. Booth
William Flinn
BY Henry C. Evert
ATTORNEY.

UNITED STATES PATENT OFFICE.

JAMES J. BOOTH AND WILLIAM FLINN, OF PITTSBURG, PENNSYLVANIA.

MEASURING-TOOL.

SPECIFICATION forming part of Letters Patent No. 544,475, dated August 13, 1895.

Application filed April 22, 1895. Serial No. 546,796. (No model.)

*To all whom it may concern:*

Be it known that we, JAMES J. BOOTH and WILLIAM FLINN, citizens of the United States of America, residing at Pittsburg, in the county of Allegheny and State of Pennsylvania, have invented certain new and useful Improvements in Testing and Measuring Tools, of which the following is a specification, reference being had therein to the accompanying drawings.

This invention relates to certain new and useful improvements in testing and measuring tools, and is particularly designed and adapted for testing and measuring the thickness of asphalt pavements.

The invention has for its object to construct a device of the above-referred-to class that will be extremely simple in its construction, strong, durable, and effectual in its operation; furthermore, one that will be comparatively inexpensive to manufacture.

A further object of our invention is to remove a core from asphalt pavements that may be readily replaced without incurring any loss or damage to the pavement.

With the above and other objects in view the invention finally consists in the novel construction, combination, and arrangement of parts, to be hereinafter more particularly described and specifically pointed out in the claims.

In describing this invention in detail, reference is had to the accompanying drawings, forming a part of this specification, and wherein like figures of reference indicate similar parts throughout the several views, in which—

Figure 1 is a front elevation of our improved testing and measuring tool. Fig. 2 is a side elevation of the same, showing the plunger inserted for removing the core. Fig. 3 is a view in perspective. Fig. 4 is a side view of the plunger. Fig. 5 is a detail view of the lower portion of the tool, carrying a scale or graduations.

In the drawings, 1 represents the body portion of the tool, which is tubular in form.

2 represents the cut-away portion for removing the core.

3 represents a slot in the body portion extending in alignment therewith the entire length of the tubular portion. The lower extremity of the tubular portion is formed into a knife-edge 7, and on the outer surface of the lower portion is provided a scale or graduations 8, said scale extending upwardly near the side of the cut-away portion 2.

The reference-figure 9 represents the plunger, the latter being composed of a handle 10, provided with an annular flange 11 and cylindrical portion 12.

When asphalt pavements are laid it is essential that the asphalt be of uniform thickness, usually from one and one-half to two inches. By the use of our improved tool any variation that exists in the thickness of the asphalt may be readily determined and accurately measured by forcing the tool into the asphalt and removing a core from the same. The knife-edge will readily penetrate the material, and by reason of the downward pressure exercised on the tool the latter will slightly expand and contract when the core is removed from the pavement. The tubular portion, being split, will also allow the tool to spring and cut around any small pieces of stone in the top coat of the asphalt; another advantage gained by this construction being that the core may be readily removed from the tool by inserting the plunger into the free end of the tubular portion. The latter will then slightly expand and effectually prevent the core from binding within the tool.

The tubular portion of the tool above the cut-away section serves as a reservoir for oiled waste for the purpose of lubrication. At the upper end of the body are arranged outwardly and upwardly extending arms 4 4, which receive the shaft 5, carrying a handle 6.

It will be noted that any number of cores may be removed from the pavement and replaced, and when rolled with a roller or tamped with hot tampers it is left in its original condition. The tool being provided with a scale, the exact thickness of the asphalt may be easily determined and any variation in the same detected.

The handle may be made in any desired form or shape, the tubular portion of the tool being constructed of any suitable material, although in actual practice we have found it advantageous to manufacture the same of steel.

It will be noted that various changes may be made in the details of construction of our improved tool without departing from the general spirit of our invention.

Having fully described our invention, what we claim as new, and desire to secure by Letters Patent, is—

1. A measuring instrument consisting of a cylindrical body having a lower cutting edge and a longitudinal slot, with a portion of the wall cut away on either side of the slot, as and for the purpose described.

2. A measuring instrument consisting of a cylindrical body having a lower cutting edge, a longitudinal slot and an aperture with a scale extending along the edge of the aperture, as and for the purpose described.

In testimony whereof we affix our signatures in presence of two witnesses.

JAMES J. BOOTH.
WILLIAM FLINN.

Witnesses:
JAMES A. FORTUNE,
JAMES B. KANE.